United States Patent
Farmer et al.

(10) Patent No.: US 10,850,707 B1
(45) Date of Patent: Dec. 1, 2020

(54) TAILGATE LOCKING SYSTEM AND METHOD OF OPERATING

(71) Applicant: Honda Motor Co., Ltd., Tokyo (JP)

(72) Inventors: Shalette M. Farmer, Bellefontaine, OH (US); William J. Tobin, Columbus, OH (US); Thanh C. Nguyen, Grove City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/688,636

(22) Filed: Nov. 19, 2019

(51) Int. Cl.
| | | |
|---|---|---|
| *B60R 25/24* | (2013.01) | |
| *B60R 25/01* | (2013.01) | |
| *B60R 25/31* | (2013.01) | |
| *G06F 3/0482* | (2013.01) | |
| *B60R 25/34* | (2013.01) | |
| *B60J 7/185* | (2006.01) | |

(52) U.S. Cl.
CPC .............. *B60R 25/24* (2013.01); *B60R 25/01* (2013.01); *B60R 25/31* (2013.01); *B60R 25/34* (2013.01); *G06F 3/0482* (2013.01); *B60J 7/185* (2013.01)

(58) Field of Classification Search
None
See application file for complete search history.

(56) References Cited

U.S. PATENT DOCUMENTS

| | | | | |
|---|---|---|---|---|
| 4,672,375 | A * | 6/1987 | Mochida | ........... B60R 25/02153 180/287 |
| 4,906,035 | A * | 3/1990 | Nagai | ..................... E05B 81/20 292/201 |
| 6,155,625 | A * | 12/2000 | Felix | ......................... B60R 9/00 296/37.1 |
| 6,471,277 | B1 * | 10/2002 | Scensny | .................... B60R 9/00 296/183.1 |
| 6,727,806 | B1 | 4/2004 | Massie et al. | |
| 7,118,151 | B2 * | 10/2006 | Bejin | ........................ B60R 5/04 296/37.1 |
| 7,400,971 | B2 | 7/2008 | Robertson | |
| 7,688,179 | B2 * | 3/2010 | Kurpinski | ........... B60R 25/2036 340/4.1 |
| 8,433,456 | B2 * | 4/2013 | Peterson | ................... G06F 7/00 307/10.1 |
| 8,626,357 | B1 * | 1/2014 | Lickfelt | ............... B60R 16/037 340/5.2 |
| 9,636,978 | B2 | 5/2017 | Warburton et al. | |
| 9,797,180 | B2 | 10/2017 | Salmon et al. | |

(Continued)

*Primary Examiner* — Chico A Foxx
(74) *Attorney, Agent, or Firm* — Armstrong Teasdale LLP (57) ABSTRACT

A locking system for use with a vehicle that has cabin doors and a tailgate. The locking system includes a first locking mechanism associated with the cabin doors, and a second locking mechanism associated with the tailgate, wherein the first locking mechanism and the second locking mechanism are selectively lockable and unlockable. A lock controller is in communication with the first locking mechanism and the second locking mechanism. The lock controller is operable in a first operating mode and a second operating mode. When in the first operating mode, the lock controller is configured to selectively lock and unlock the first locking mechanism and the second locking mechanism synchronously. When in the second operating mode, the lock controller is configured to lock and unlock the first locking mechanism independently of the second locking mechanism.

20 Claims, 4 Drawing Sheets

(56) References Cited

U.S. PATENT DOCUMENTS

| | | | | |
|---|---|---|---|---|
| 9,842,448 B1* | 12/2017 | Lickfelt | ............... | G08C 17/02 |
| 10,286,873 B1* | 5/2019 | Krush | ............... | G07C 9/00309 |
| 10,538,220 B1* | 1/2020 | Tyagi | ............... | B60R 25/24 |
| 2003/0058086 A1* | 3/2003 | Hara | ............... | B60R 25/245 |
| | | | | 340/425.5 |
| 2003/0222758 A1* | 12/2003 | Willats | ............... | B60R 25/24 |
| | | | | 340/5.72 |
| 2005/0057062 A1* | 3/2005 | McClure | ............... | B62D 43/10 |
| | | | | 296/37.6 |
| 2007/0096499 A1* | 5/2007 | Zajicek | ............... | B60J 7/1621 |
| | | | | 296/100.06 |
| 2008/0122595 A1* | 5/2008 | Yamamichi | ............... | B60R 25/24 |
| | | | | 340/426.16 |
| 2009/0085720 A1* | 4/2009 | Kurpinski | ............... | B60R 25/246 |
| | | | | 340/5.64 |
| 2009/0146846 A1* | 6/2009 | Grossman | ............... | G06F 3/0488 |
| | | | | 340/988 |
| 2010/0075655 A1* | 3/2010 | Howarter | ............... | G07C 9/00309 |
| | | | | 455/420 |
| 2014/0129054 A1* | 5/2014 | Huntzicker | ............... | G06F 17/00 |
| | | | | 701/2 |
| 2014/0300494 A1* | 10/2014 | Tseng | ............... | B60K 37/06 |
| | | | | 340/932.2 |
| 2015/0102898 A1* | 4/2015 | Huennekens | ............... | G07C 9/28 |
| | | | | 340/5.6 |
| 2016/0247403 A1* | 8/2016 | Krauss | ............... | G08G 1/166 |
| 2017/0074000 A1* | 3/2017 | Banvait | ............... | B60R 16/02 |
| 2017/0113650 A1* | 4/2017 | Caushi | ............... | G07C 9/00174 |
| 2017/0120867 A1* | 5/2017 | Beauvais | ............... | B60R 25/24 |
| 2017/0166164 A1* | 6/2017 | Sticherling | ............... | B60R 25/24 |
| 2017/0166169 A1* | 6/2017 | Muller | ............... | B60R 25/24 |
| 2017/0174179 A1* | 6/2017 | Schumacher | ............... | B60R 16/037 |
| 2017/0182975 A1* | 6/2017 | Monig | ............... | B60R 25/24 |
| 2017/0232930 A1* | 8/2017 | Murar | ............... | B60Q 1/32 |
| | | | | 340/5.61 |
| 2017/0236344 A1* | 8/2017 | Murar | ............... | G07C 9/20 |
| | | | | 340/5.61 |
| 2017/0327079 A1* | 11/2017 | Grossmann | ............... | B60R 25/245 |
| 2017/0369034 A1* | 12/2017 | Bilik | ............... | B60R 25/01 |
| 2017/0370132 A1* | 12/2017 | Da Deppo | ............... | B62D 33/03 |
| 2018/0313117 A1 | 11/2018 | Whitham | | |
| 2019/0055756 A1* | 2/2019 | Ducka | ............... | E05F 15/77 |
| 2019/0092280 A1* | 3/2019 | Oesterling | ............... | G06Q 10/02 |
| 2019/0168712 A1* | 6/2019 | Yakovenko | ............... | B60R 25/24 |
| 2019/0275986 A1* | 9/2019 | Yakovenko | ............... | B60R 25/01 |

* cited by examiner

TAILGATE LOCKING SYSTEM AND METHOD OF OPERATING

BACKGROUND

The present disclosure relates generally to power locking systems for use with vehicles and, more specifically, to a tailgate power locking system that can be selectively enabled and disabled based on user preferences.

Vehicles, such as pickup trucks, include a passenger cabin and an open-air cargo bed that extends from the passenger cabin. The cargo bed typically includes a tailgate that is positionable between open and closed positions to provide selective access to the cargo bed. At least some tailgates may be selectively locked or unlocked. When unlocked, a user is able to lower or swing the tailgate to the open position by actuating a latch and physically lowering the tailgate. When locked, the user must first unlock the tailgate before they will be able to actuate the latch and physically lower the tailgate. A locking tailgate provides minimal security to objects placed in an open truck bed, that is, only makes it slightly more difficult to remove an object from the truck bed. However, when used in conjunction with a tonneau cover or other truck bed covering, the locked tailgate physically restricts access to the cargo bed and provides enhanced security for items stored therein. In at least some known pickup trucks, the tailgate may be locked and unlocked manually, for example, using a key, which can be an inconvenient and/or laborious task. Alternatively, at least some known tailgates must be locked and unlocked in sync with the power door locks of the vehicle. However, syncing the lockability of the tailgate with the door locks may limit the free access and usability of the cargo bed when security of the passenger cabin, but not the cargo bed, is a concern.

BRIEF DESCRIPTION

In one aspect, a locking system for use with a vehicle that has cabin doors and a tailgate is provided. The locking system includes a first locking mechanism associated with the cabin doors, and a second locking mechanism associated with the tailgate, wherein the first locking mechanism and the second locking mechanism are selectively lockable and unlockable. A lock controller is in communication with the first locking mechanism and the second locking mechanism. The lock controller is operable in a first operating mode and a second operating mode. When in the first operating mode, the lock controller is configured to selectively lock and unlock the first locking mechanism and the second locking mechanism synchronously. When in the second operating mode, the lock controller is configured to lock and unlock the first locking mechanism independently of the second locking mechanism.

In another aspect, a vehicle is provided. The vehicle includes cabin doors, a cargo bed including a tailgate, and a locking system. The locking system includes a first locking mechanism associated with the cabin doors, a second locking mechanism associated with the tailgate, wherein the first locking mechanism and the second locking mechanism are selectively lockable and unlockable, and a lock controller in communication with the first locking mechanism and the second locking mechanism. The lock controller is operable in a first operating mode and a second operating mode. When in the first operating mode, the lock controller is configured to selectively lock and unlock the first locking mechanism and the second locking mechanism synchronously. When in the second operating mode, the lock controller is configured to lock and unlock the first locking mechanism independently of the second locking mechanism.

In yet another aspect, a method of operating a locking system of a vehicle is provided. The method includes setting, based on reception of an input on a user interface, the locking system in a first operating mode or a second operating mode. The method also includes, on command, synchronously locking and unlocking a first locking mechanism and a second locking mechanism when the locking system is set in the first operating mode. The first locking mechanism is associated with cabin doors of the vehicle, and the second locking mechanism is associated with a tailgate of the vehicle. The method also includes, on command, locking and unlocking the first locking mechanism independently of the second locking mechanism when the locking system is set in the second operating mode.

DETAILED DESCRIPTION

The embodiments described herein relate generally to a tailgate power locking system that can be selectively enabled and disabled based on user selectivity. The locking system includes a first locking mechanism associated with cabin doors of a vehicle, and a second locking mechanism associated with a tailgate of the vehicle. A lock controller is in communication with the first and second locking mechanisms, and may be used to control operation of the first and second locking mechanisms in accordance with either a first operating mode or a second operating mode. In the first operating mode, the lock controller locks and unlocks the first and second locking mechanisms synchronously with each other. In the second operating mode, the lock controller locks and unlocks the first locking mechanism independently of the second locking mechanism. A user of the vehicle may manually select the operating mode of the lock controller. For example, the user may opt to select the first operating mode when a cargo bed of the vehicle has items stored therein, and the user desires security for both the passenger cabin and the cargo bed. Alternatively, the user may opt to select the second operating mode when the user desires security for the passenger cabin, but desires convenient ease of access to the cargo bed. The systems and methods described herein provide the user of the vehicle with the ability to choose a power tailgate locking option based on their current needs and preferences.

Figure 1:
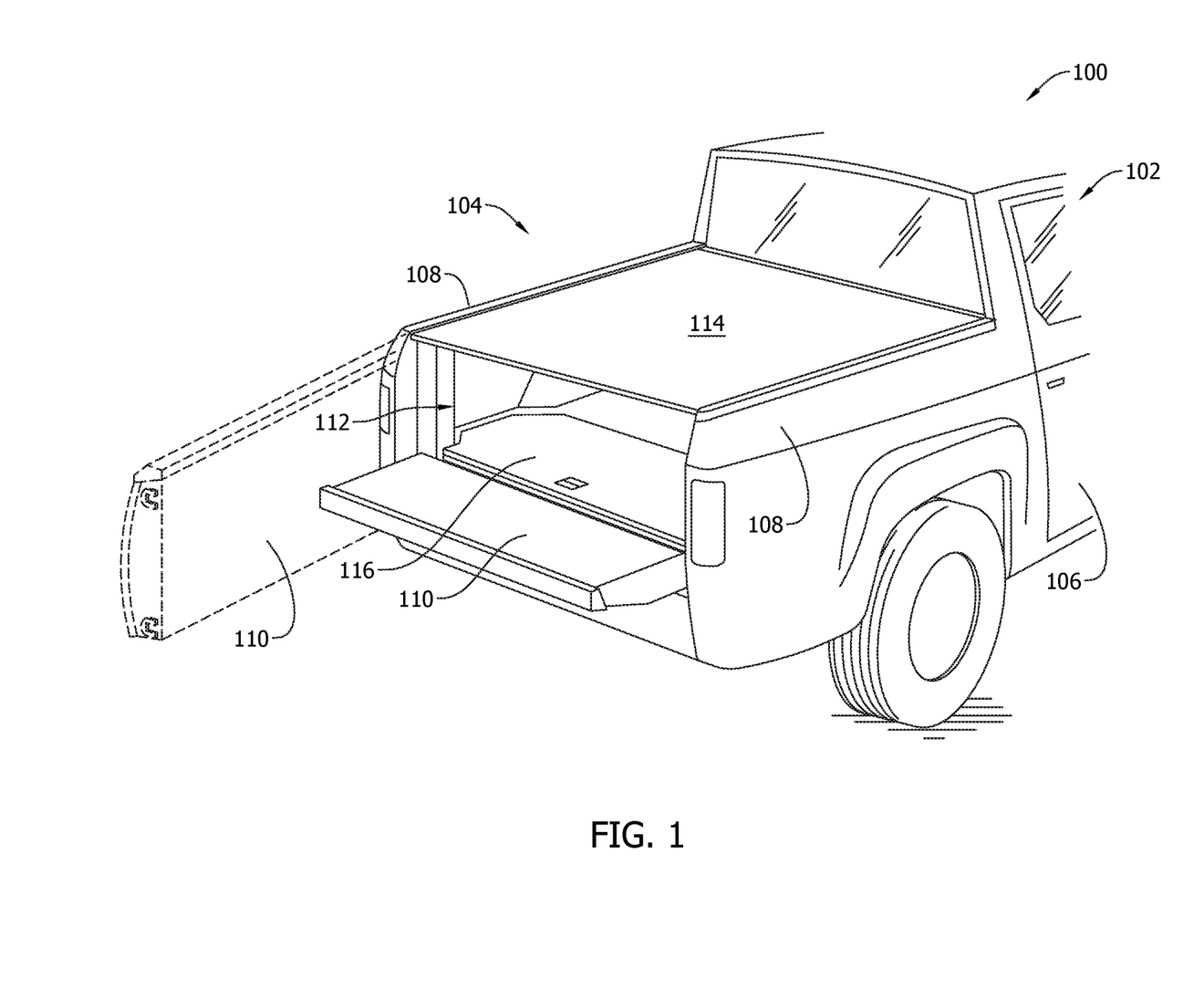
FIG. 1 is a perspective view of a rear end of an example vehicle.

FIG. 1 is a perspective view of a rear end of an example vehicle 100. In the example embodiment, vehicle 100 is a pickup truck having a passenger cabin 102 and a cargo bed 104 extending aftward from passenger cabin 102. Passenger cabin 102 includes one or more cabin doors 106. Cargo bed 104 is defined by side walls 108 and a tailgate 110, which is rotatable to provide access to an interior 112 of cargo bed 104. Cargo bed 104 may also include a cargo bed cover 114 and/or an in-bed trunk 116. Cargo bed cover 114 (i.e., a tonneau cover) is removably coupled to passenger cabin 102 and side walls 108, and may be selectively opened and closed to provide access to interior 112 of cargo bed 104. For example, cargo bed cover 114 may be a rigid structure that is rotatable relative to passenger cabin 102, or may be a flexible sheet that is rollable or foldable, to provide access to interior 112. In-bed trunk 116 provides additional storage within cargo bed 104.

Figure 2:
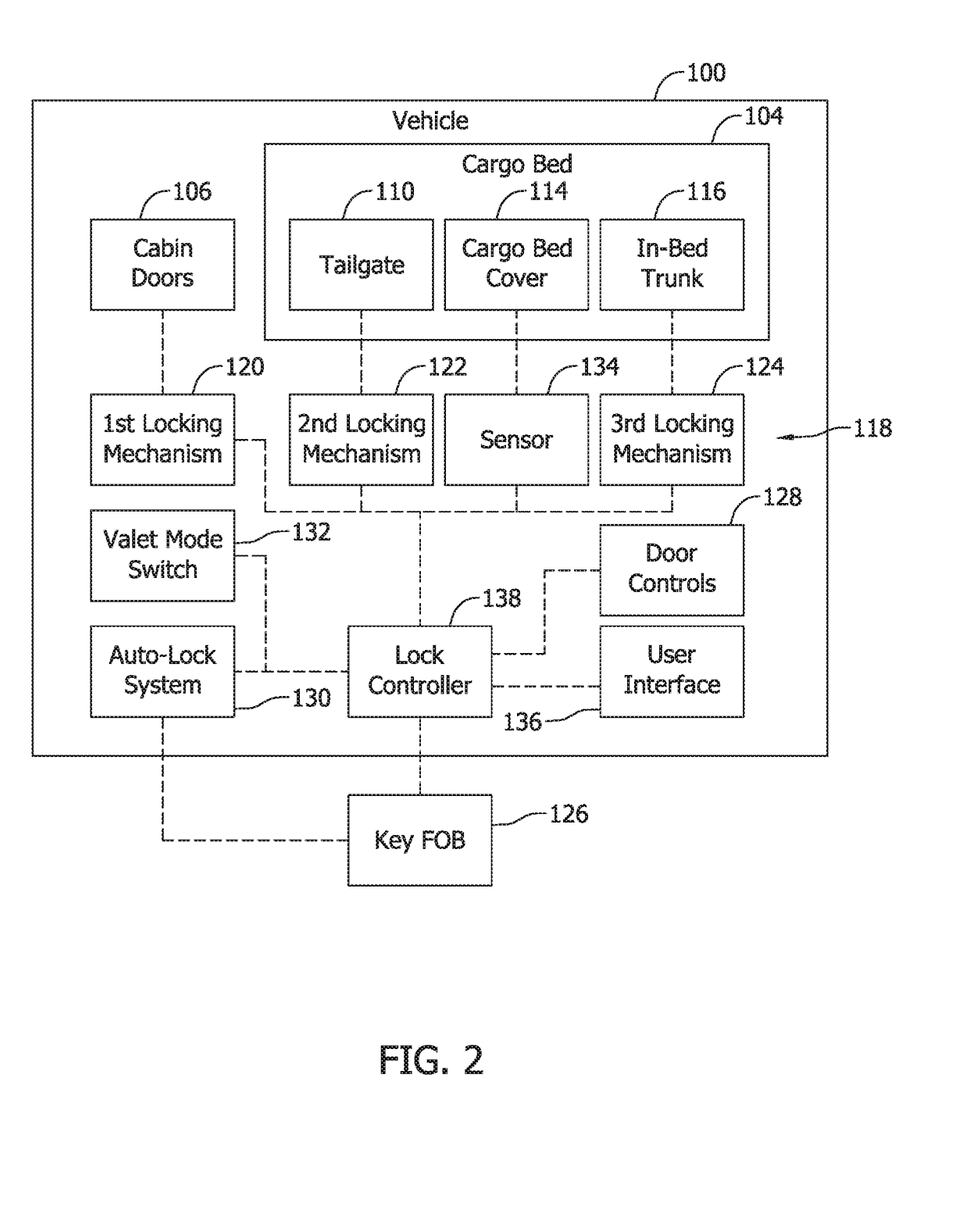
FIG. 2 is a block diagram illustrating example components of the vehicle shown in FIG. 1.

FIG. 2 is a block diagram illustrating components of a vehicle, for example, vehicle 100 (shown in FIG. 1). In the example embodiment, vehicle 100 includes a locking system 118 that controls security and access to the various compartments of vehicle 100, such as passenger cabin 102, cargo bed 104, and in-bed trunk 116 (all shown in FIG. 1). For example, locking system 118 includes a first locking mechanism 120 associated with cabin doors 106, a second locking mechanism 122 associated with tailgate 110, and a third locking mechanism 124 associated with in-bed trunk 116. The locking mechanisms 120, 122, and 124 may include components such as electric motors, linkages, and cables (not shown) to facilitate locking and unlocking of cabin doors 106, tailgate 110, and in-bed trunk 116. Locking system 118 may be controlled via a remote keyless entry device, for example, a key FOB 126, or by interior/exterior door controls 128, such as interior cabin lock/unlock switches or exterior door handle locking/unlocking features. Alternatively, or additionally, locking system 118 may also be controlled by automated systems, such as a walk-away/proximity auto-lock system 130 and/or a valet mode switch 132. Additionally, system 118 may be controlled based on feedback received from a sensor 134 that determines a relative position of cargo bed cover 114, as will be explained in more detail below.

Figure 5:
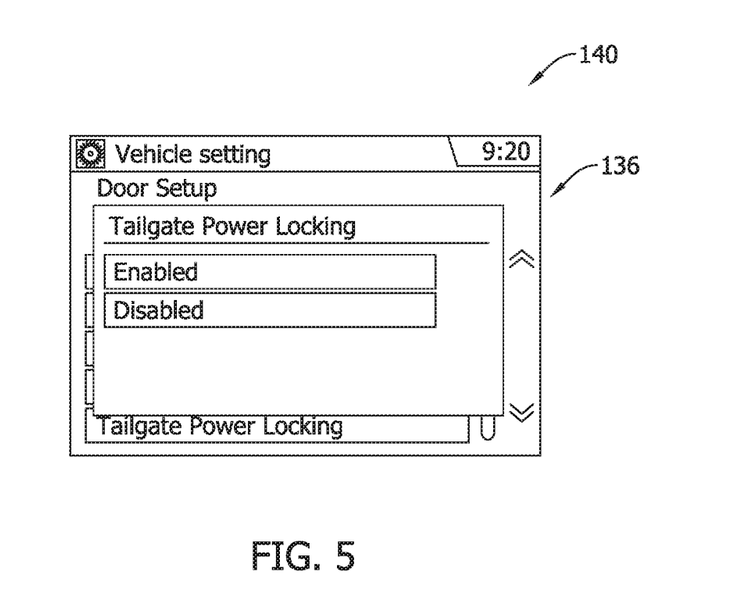
FIG. 5 is an example user interface that may be used with a locking system, such as the locking system shown in FIG. 2.

Vehicle 100 also includes a user interface 136 in communication with a lock controller 138. Lock controller 138 receives inputs from key FOB 126, interior/exterior door controls 128, auto-lock system 130, valet mode switch 132, and/or sensor 134, and controls operation of locking mechanisms 120, 122, and 124 as a result, as will be described in more detail below. As shown in FIG. 5, user interface 136 is integrated into an infotainment system 140 located within passenger cabin 102 (shown in FIG. 1). Infotainment system 140 enables the user of vehicle 100 to control various aspects of vehicle 100, such as navigation controls, audio settings, and vehicle settings, for example. In the example embodiment, infotainment system 140 is navigable by the user to reach a display screen that enables the user to control a tailgate power locking feature of vehicle 100. For example, user interface 136 displays a user-selectable option to enable or disable the tailgate power locking feature. In other words, the user-selectable options enable lock controller 138 (shown in FIG. 2) to be toggled between a first operating mode (i.e., enabled tailgate power locking feature) and a second operating mode (i.e., disabled tailgate power locking feature).

Referring again to FIG. 2, the first operating mode is defined by the synchronous locking and unlocking of first locking mechanism 120 in conjunction with second locking mechanism 122 via lock controller 138. In vehicles 100 having in-bed trunk 116, the locking and unlocking of third locking mechanism 124 may also be performed in sync with first locking mechanism 120 and second locking mechanism 122. The second operating mode is defined by the locking and unlocking of first locking mechanism 120, independently of second locking mechanism 122, and third locking mechanism 124 when applicable, by way of lock controller 138. In at least some embodiments, when in the second operating mode, the second locking mechanism 122 maintains tailgate 110 in an unlocked state at all times allowing uninhibited access to the cargo bed 104 even when the cabin doors 106 are locked. In other example embodiments, when the second operating mode is activated, second locking mechanism 122 and third locking mechanism 124 may be locked and unlocked manually when they are not responsive to lock/unlock user commands via key FOB 126 or interior/exterior door controls 128, for example.

Figure 3:
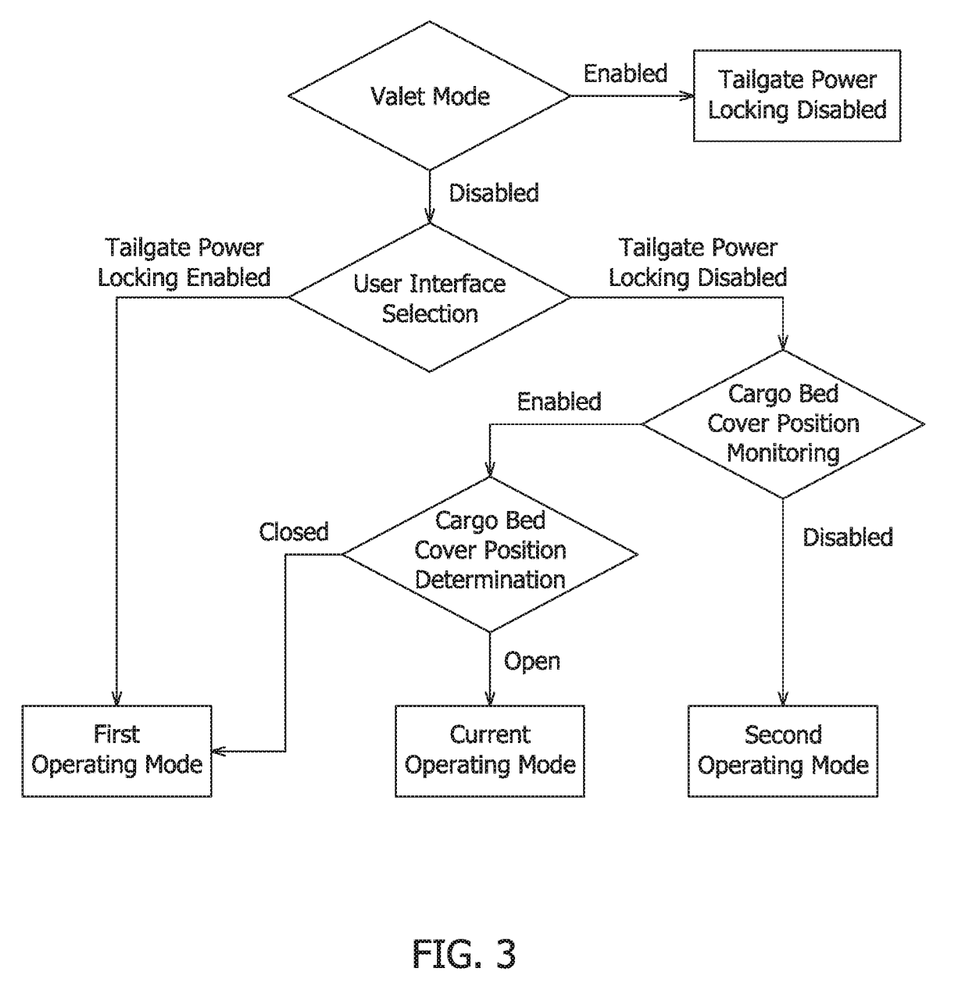
FIG. 3 is a flow diagram illustrating example logic that may be used to operate a locking system used with the vehicle shown in FIG. 1.

FIG. 3 is a flow diagram illustrating example logic that may be used to operate locking system 118 of vehicle 100 (both shown in FIG. 2). In the example embodiment, operation of locking system 118 may also be dependent upon a status of a valet mode of vehicle 100. In such an embodiment, locking system 118 (i.e., lock controller 138 (shown in FIG. 2)) is operable as a function of the status of a valet mode of vehicle 100, such as by toggling valet mode switch 132 (shown in FIG. 2). The valet mode, when activated, restricts access to certain functionalities of vehicle 100 for security purposes. More specifically, a valet attendant would not require uninhibited access to the truck bed, and it is more likely that the owner of vehicle 100 would prefer the second locking mechanism 122 to be locked when in valet mode. Accordingly, lock controller 138 may automatically lock second locking mechanism 122 (shown in FIG. 2) when the valet mode is enabled, and maintain the second locking mechanism 122 in the locked state until valet mode is disabled. When the valet mode is disabled, user interface 136 (shown in FIG. 5) may display the user-selectable option to enable or disable the tailgate power locking feature. Also, when the valet mode is disabled, lock controller 138 may return to the previous tailgate power locking setting. When the tailgate power locking feature is enabled, lock controller 138 operates in the first operating mode.

When the tailgate power locking feature is disabled, lock controller 138 generally operates in the second operating mode. However, vehicle 100 may include one or more optional security features that override the user selection to disable the tailgate power locking feature. For example, in embodiments where vehicle 100 includes cargo bed cover 114 (shown in FIG. 2), vehicle 100 may also include a sensor, such as sensor 134 (shown in FIG. 2) that determines a position of cargo bed cover 114 on vehicle 100. Sensor 134 may be directly attached to cargo bed 104, or to any other portion of vehicle 100 that enables the position of cargo bed cover 114 to be monitored in real-time. Sensor 134 may be a contact or non-contact sensor. Example non-contact sensor technology includes, but is not limited to, optical, infrared, inductive, capacitive, and the like. Similar to the toggling of the tailgate power locking feature, operation of sensor 134 and the position monitoring of cargo bed cover 114 may be enabled and disabled by the user of vehicle 100 via user interface 136.

Because the position of cargo bed cover 114 is monitored, a user may select a desired level of security for cargo bed 104. For example, when cargo bed cover 114 is in an open position, cargo bed 104 is freely accessible such that activating lock controller 138 into the first operating mode may be ineffective at providing the level of security that the user desires. Accordingly, when it is determined cargo bed cover 114 is in the open position, the operation of lock controller 138 remains unchanged and lock controller 138 defaults its operation to its currently set operating mode. Alternatively, access to cargo bed 104 is restricted when cargo bed cover 114 is in a closed position. Accordingly, when it is determined cargo bed cover 114 is determined to be in the closed position, lock controller 138 is automatically set to operate in the first operating mode regardless of the current tailgate power locking feature mode selected by the user.

Figure 4:
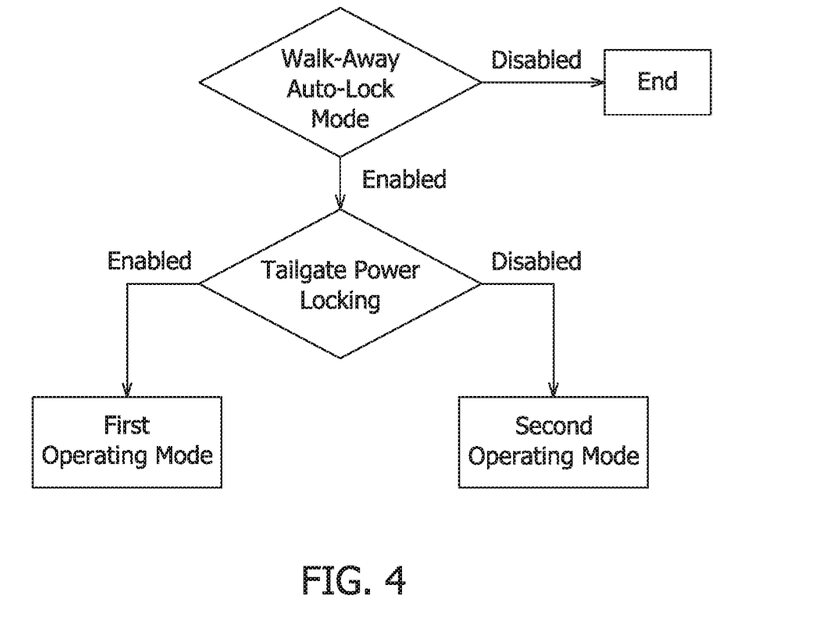
FIG. 4 is a flow diagram illustrating additional example logic that may be used to operate a locking system used with the vehicle shown in FIG. 1.

FIG. 4 is a flow diagram illustrating additional logic that may be used to operate locking system 118 of vehicle 100 (both shown in FIG. 1). In the example embodiment, locking system 118 (i.e., lock controller 138 (shown in FIG. 2)) is operable as a function of the status of a walk-away/proximity auto-lock mode of vehicle 100. The walk-away/proximity auto-lock mode is controlled by auto-lock system 130 (shown in FIG. 2), which facilitates activating (i.e., locking) first locking mechanism 120, second locking mechanism 122, and third locking mechanism 124 automatically based on a proximity of key FOB 126 relative to vehicle 100 (all shown in FIG. 2). For example, auto-lock system 130 is automatically activated when it is determined key FOB 126 is no longer positioned within a predetermined proximity to vehicle 100. In the example embodiment, operation of the walk-away/proximity auto-lock mode and the tailgate power locking feature are linked to provide enhanced security for vehicle 100. As such, as shown in FIG. 4, if the walk-away/proximity auto-lock mode is enabled and lock controller 138 is set to operate in the first operating mode, first locking mechanism 120 will lock cabin doors 106 and second locking mechanism 122 will lock tailgate 110 when it is determined that key FOB 126 is no longer within a predetermined proximity to vehicle 100. Moreover, if the walk-away/proximity auto-lock mode is enabled and lock controller 138 is set to operate in the second operating mode, first locking mechanism 120 will lock cabin doors 106 when it is determined that key FOB 126 is no longer within a predetermined proximity to vehicle 100 but second locking mechanism 122 will maintain tailgate 110 in an unlocked state.

The embodiments described herein relate to a tailgate power locking system that provides enhanced security for a cargo bed of a vehicle, such as a pickup truck. A user of the vehicle has the ability to select an operating mode of the locking system based on his current needs and preferences. For example, the user may opt to select the first operating mode when a cargo bed of the vehicle has items stored therein, and the user desires security for both the passenger cabin and the cargo bed. Alternatively, the user may opt to select the second operating mode when the user desires security for the passenger cabin, but desires convenient ease of access to the cargo bed. Accordingly, the user has the option to equip the vehicle with enhanced security for the cargo bed, or to enable quick access or group activity access to the cargo bed.

Exemplary embodiments of tailgate power locking system are described above in detail. Although the systems herein are described and illustrated in association with a pickup, the invention is also intended for use in any vehicle having a cargo bed in which a user of the vehicles desires enhanced security and versatility. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A locking system for use with a vehicle that includes a passenger cabin, cabin doors that are rotatable to selectively provide access to the passenger cabin, a cargo bed extending from the passenger cabin, and a tailgate that is rotatable to selectively provide access to the cargo bed, the locking system comprising:
a first locking mechanism associated with the cabin doors;
a second locking mechanism associated with the tailgate to provide a tailgate power locking feature, wherein the first locking mechanism and the second locking mechanism are selectively lockable and unlockable; and
a lock controller in communication with the first locking mechanism and the second locking mechanism, wherein the lock controller is operable in a first operating mode and a second operating mode, wherein the tailgate power locking feature is enabled when the lock controller is in the first operating mode such that the lock controller is configured to selectively lock and unlock the first locking mechanism and the second locking mechanism synchronously in response to user commands, and wherein the tailgate power locking feature is disabled when the lock controller is in the second operating mode such that the lock controller is configured to lock and unlock the first locking mechanism independently of the second locking mechanism in response to the user commands, such that the second locking mechanism is not responsive to the user commands, and such that the second locking mechanism is manually lockable and unlockable to selectively provide access to the cargo bed via the tailgate regardless of the locked or unlocked status of the first locking mechanism.

2. The locking system in accordance with claim 1, wherein the lock controller, when in the second operating mode, maintains the second locking mechanism in an unlocked state regardless of the locked or unlocked status of the first locking mechanism.

3. The locking system in accordance with claim 1, wherein the lock controller is further operable as a function of a valet mode, the lock controller at least one of disabled from toggling between the first operating mode and the second operating mode when the valet mode is enabled, and configured to lock the second locking mechanism when the valet mode is enabled.

4. The locking system in accordance with claim 1 further comprising a sensor configured to monitor a position of a cargo bed cover on the vehicle, wherein the sensor is in communication with the lock controller, and wherein the lock controller is automatically set to the first operating mode when the cargo bed cover is in a closed position.

5. The locking system in accordance with claim 1, wherein the lock controller is operable as a function of a walk-away/proximity auto-lock mode, the lock controller configured to lock the second locking mechanism synchronously with the first locking mechanism when the walk-away/proximity auto-lock mode is enabled and the lock controller is in the first operating mode.

6. The locking system in accordance with claim 1 further comprising a third locking mechanism associated with an in-bed trunk of the vehicle, wherein the lock controller is configured to selectively lock and unlock the third locking mechanism synchronously with the second locking mechanism when the lock controller is in the first operating mode.

7. A vehicle comprising:
a passenger cabin;
cabin doors that are rotatable to selectively provide access to the passenger cabin;
a cargo bed extending from the passenger cabin;
a tailgate that is rotatable to selectively provide access to the cargo bed;
a locking system comprising:
  a first locking mechanism associated with the cabin doors;
  a second locking mechanism associated with the tailgate to provide a tailgate power locking feature, wherein the first locking mechanism and the second locking mechanism are selectively lockable and unlockable; and
  a lock controller in communication with the first locking mechanism and the second locking mechanism, wherein the lock controller is operable in a first operating mode and a second operating mode, wherein the tailgate power locking feature is enabled when the lock controller is in the first operating mode such that the lock controller is configured to selectively lock and unlock the first locking mechanism and the second locking mechanism synchronously in response to user commands, and wherein the tailgate power locking feature is disabled when the lock controller is in the second operating mode such that the lock controller is configured to lock and unlock the first locking mechanism independently of the second locking mechanism in response to the user commands, such that the second locking mechanism is not responsive to the user commands, and such that the second locking mechanism is manually lockable and unlockable to selectively provide access to the cargo bed via the tailgate regardless of the locked or unlocked status of the first locking mechanism.

8. The vehicle in accordance with claim 7 further comprising a user interface configured to display a user-selectable option to toggle the lock controller between the first operating mode and the second operating mode.

9. The vehicle in accordance with claim 7, wherein the lock controller is further operable as a function of a valet mode, the lock controller at least one of disabled from toggling between the first operating mode and the second operating mode when the valet mode is enabled, and configured to lock the second locking mechanism when the valet mode is enabled.

10. The vehicle in accordance with claim 7 further comprising:
a cargo bed cover positionable between an open position for exposing the cargo bed, and a closed position for covering the cargo bed; and
a sensor configured to monitor a position of the cargo bed cover on the cargo bed, wherein the sensor is in communication with the lock controller, and wherein the lock controller is automatically set to the first operating mode when the cargo bed cover is in the closed position.

11. The vehicle in accordance with claim 7, wherein the lock controller is operable as a function of a walk-away/proximity auto-lock mode, the lock controller configured to lock the second locking mechanism synchronously with the first locking mechanism when the walk-away/proximity auto-lock mode is enabled and the lock controller is in the first operating mode.

12. The vehicle in accordance with claim 7 further comprising a third locking mechanism associated with an in-bed trunk of the vehicle, wherein the lock controller is configured to selectively lock and unlock the third locking mechanism synchronously with the second locking mechanism when the lock controller is in the first operating mode.

13. The vehicle in accordance with claim 7, wherein the lock controller is operable as a function of a valet mode, the lock controller configured to lock the second locking mechanism when the valet mode is enabled.

14. A method of operating a locking system of a vehicle that includes a passenger cabin, cabin doors that are rotatable to selectively provide access to the passenger cabin, a cargo bed extending from the passenger cabin, and a tailgate that is rotatable to selectively provide access to the cargo bed, the method comprising:
setting, based on reception of an input on a user interface, the locking system in a first operating mode or a second operating mode, wherein the locking system includes a first locking mechanism associated with the cabin doors of the vehicle, and a second locking mechanism associated with the tailgate of the vehicle;
on command, synchronously locking and unlocking the first locking mechanism and the second locking mechanism when the locking system is set in the first operating mode; and
on command, locking and unlocking the first locking mechanism independently of the second locking mechanism when the locking system is set in the second operating mode, wherein the second locking mechanism is not responsive to user commands when the locking system is set in the second operating mode, and wherein the second locking mechanism is manually lockable and unlockable to selectively provide access to the cargo bed via the tailgate regardless of the locked or unlocked status of the first locking mechanism.

15. The method in accordance with claim 14 further comprising displaying, on the user interface, a user-selectable option to toggle between the first operating mode and the second operating mode.

16. The method in accordance with claim 14 further comprising:
determining a status of a valet mode of the vehicle; and
disabling toggling, at the user interface, between the first operating mode and the second operating mode when the valet mode is enabled.

17. The method in accordance with claim 14 further comprising:
determining a position of a cargo bed cover on the vehicle; and
automatically setting the locking system to the first operating mode when the cargo bed cover is in a closed position.

18. The method in accordance with claim 14 further comprising:
determining a status of a walk-away/proximity auto-lock mode of the vehicle; and
locking the second locking mechanism in sync with the first locking mechanism when the walk-away/proximity auto-lock mode is enabled.

19. The method in accordance with claim 14 further comprising, on command, synchronously locking and unlocking the second locking mechanism and a third locking mechanism when the locking system is set in the first operating mode, wherein the third locking mechanism is associated with an in-bed trunk of the vehicle.

20. The method in accordance with claim 14 further comprising:
   determining a status of a valet mode of the vehicle; and
   locking the second locking mechanism when the valet mode is enabled.

\* \* \* \* \*